United States Patent
Dai et al.

(10) Patent No.: US 6,917,503 B2
(45) Date of Patent: Jul. 12, 2005

(54) PROGRAMMABLE CURRENT LIMITING USING A SHUNT RESISTOR

(75) Inventors: Heping Dai, Plano, TX (US); Alan Hastings, Allen, TX (US); David A. Arciniega, Sachse, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/696,049

(22) Filed: Oct. 29, 2003

(65) Prior Publication Data
US 2005/0094340 A1 May 5, 2005

(51) Int. Cl.[7] .................................................. H02H 9/02
(52) U.S. Cl. ............................. 361/93.1; 361/93.7
(58) Field of Search ............................. 361/93.1, 93.7; 324/705, 713

(56) References Cited

U.S. PATENT DOCUMENTS

| | | | | |
|---|---|---|---|---|
| 3,573,638 A | * | 4/1971 | Cox et al. ................... | 327/74 |
| 3,700,918 A | * | 10/1972 | Kawashima .............. | 327/350 |
| 4,334,186 A | * | 6/1982 | Sasayama et al. .......... | 323/365 |
| 5,001,928 A | * | 3/1991 | Ogasawara ............... | 73/304 R |
| 6,014,030 A | * | 1/2000 | Smith et al. ............... | 324/705 |

OTHER PUBLICATIONS

Adel S.Sedra et al. Microelectronic Circuits 1987, Holt, Reinhart and Winston, pp. 342–345.*

* cited by examiner

Primary Examiner—Brian Sircus
Assistant Examiner—Zeev Kitov
(74) Attorney, Agent, or Firm—J. Dennis Moore; W. James Brady, III; Frederick J. Telecky, Jr.

(57) ABSTRACT

An overcurrent protection circuit using a shunt resistor and the voltage drop across a switch to program a user-defined current limiting level. This protects the switch and the input power supply, as well as the load. The shunt resistor is connected to the input or output of the switch, and a temperature dependent current source, so that a voltage drop is generated across the shunt resistor. An amplifier is used to sense the voltage across the shunt resistor and the voltage drop across the switch. When the voltage drop across the switch exceeds the voltage drop across the shunt resistor, the amplifier will regulate the switch so that a voltage drop across the switch is equal to the voltage drop across the shunt resistor. In this way, a constant current through the switch can be achieved. A constant ratio between the current limiting level to the shunt resistor value can be achieved with this method, so the current limiting level is programmable by selecting the resistor value.

20 Claims, 1 Drawing Sheet

PROGRAMMABLE CURRENT LIMITING USING A SHUNT RESISTOR

TECHNICAL FIELD OF THE INVENTION

This invention relates to current limiting and more particularly to programmable current limiting using a shunt resistor and a field-effect transistor, particularly in current limiting for a hot swap board application.

BACKGROUND OF THE INVENTION

When a short circuit or current surge occurs on the load of a powered switch, or a switch is powered into a short circuit or heavy load, there occurs an excessive current through the switch. This current can destroy the switch by exceeding the safe-operating area of the switch, and damage the input power supply or cause a voltage transient on the input power supply network which can result in the malfunction of other circuitry due to the undervoltage condition. This problem is often evident when inserting or removing a circuit board under operating conditions ("hot swapping") into a powered backplane. Current limiting circuits are used to control the initial current and protect against voltage transients when hot swapping.

FIG. 1 shows a circuit diagram for a current limiting circuit used to allow safe hot swapping of a circuit board 10 according to a prior art design. The circuit receives a voltage source $V_s$ 12 and a voltage reference (GND) 14 from a connector 16 when connected to a back plane connector (not shown). A sense resistor $R_s$ 18 is placed in series with a switch 20 between the input voltage source and the board load. The switch connects the voltage source to the board circuits which are indicated by the load capacitor $C_L$ 22. A control circuit 24 connects to the gate and controls the switch 20. Inputs to the control circuit are from connections on either side of $R_S$. On the input voltage side of Rs a shunt resistor $R_{SH}$ 26 is used in the connection to the control circuit 24. The control circuit compares the voltage drop on $R_S$ and the voltage drop on the shunt resistor 26 to control the input current through the switch 20. The connections to the control circuit are shown with 45 degree connections to indicate Kelvin sense connections, which include a power wire and a sense wire to more accurately read the small voltage differences.

FIG. 2 shows a circuit diagram for a current limiting circuit according to another prior art design. Similar to the previous circuit, the switch connects the voltage source to the board circuits which are indicated by the load capacitor $C_L$ 22. A control circuit 24 connects to the gate and controls the switch 20. In this circuit, inputs to the control circuit are from connections on either side of the switch. The control circuit monitors the voltage drop across the switch 20 to control the input current through the switch. In this prior art circuit, the control circuit merely checked for a threshold voltage drop and shut down the circuit for an emergency overload condition.

SUMMARY OF THE INVENTION

The present invention overcomes some problems and provides advantages over the described prior art current limiting circuits. In the present invention the voltage drop across the conducting switch is used to regulate the conduction current. In an embodiment, the circuit uses a temperature dependent current source, a shunt resistor to set a voltage threshold, and an amplifier to guarantee the voltage drop across the switch does not exceed the voltage across the shunt resistor.

In an embodiment of the present invention, overcurrent protection is provided using a shunt resistor and the voltage drop across the switch to program a user-defined current limiting level. This protects the switch and the input power supply, as well as the load. The shunt resistor is connected to the input or output of the switch, and a temperature dependent current source, so that a voltage drop is generated across the shunt resistor. The voltage across the shunt resistor and the voltage drop across the switch are fed to an amplifier that controls the gate voltage of the switch. When the voltage drop across the switch exceeds the voltage drop across the shunt resistor, an amplifier will regulate the switch so that a voltage drop across the switch is equal to the voltage drop across the shunt resistor. In this way, a constant current through the switch can be achieved. A constant ratio between the current limiting level to the shunt resistor value can be achieved with this method, so the current limiting level is programmable by selecting the resistor value.

The current source that sets the voltage drop across the shunt resistor is preferably a linear temperature dependent source, such as a PTAT (Proportional To Absolute Temperature) source, and can be adjusted by a resistor if so desired. The temperature dependency of the current source (presumably linear) which drives the shunt resistor largely compensates for variation of switch RDS(on) versus temperature, as neither the external power field-effect transistor (FET) switch nor the control chip dissipate large amounts of heat in normal operation.

An advantage of an embodiment of the present invention is no sense resistor or other sense element is needed in the power conduction path. The sense element of the prior art adds an undesirable extra voltage drop in the power conduction path and an appreciable addition to the board's cost.

Another advantage of an embodiment of the present invention is the current limiting level is programmable by one resistor external to the control circuit.

Another advantage of an embodiment of the present invention is the circuit is largely compensated for variations in ambient temperature.

DETAILED DESCRIPTION OF THE INVENTION

Figure 1:
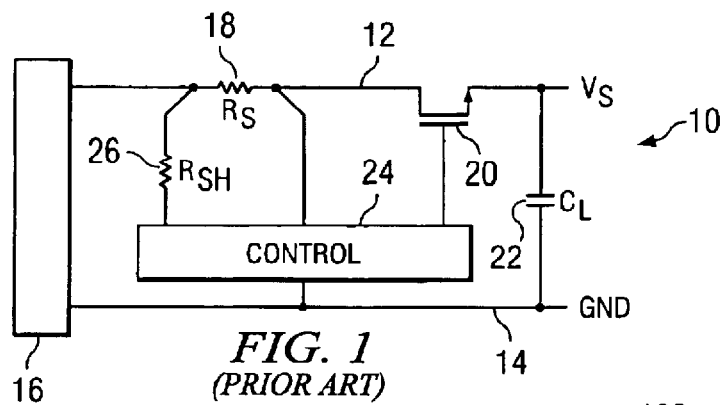
FIG. 1 illustrates a circuit diagram according to the prior art.
Figure 2:
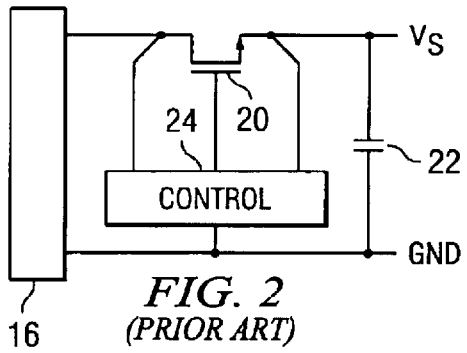
FIG. 2 illustrates a circuit diagram according to the prior art.
Figure 3A:
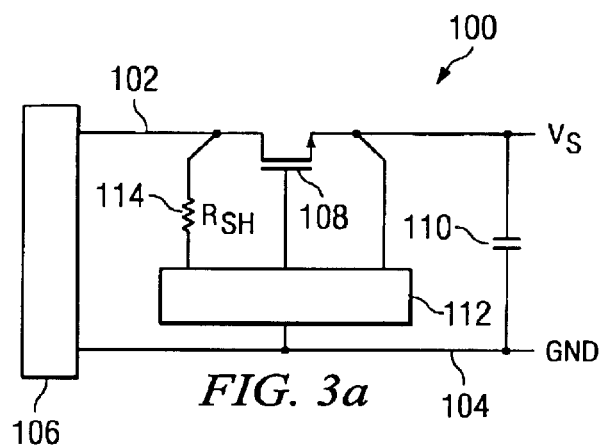
FIG. 3a and 3b illustrates circuit diagrams according to an embodiment of the present invention.

FIG. 3a shows a circuit diagram for a current limiting circuit used to allow safe hot swapping of a circuit board 100 according to the present invention. The circuit receives a voltage source $V_s$ 102 and a voltage reference (GND) 104 from a connector 106 when connected to a back plane connector (not shown). A switch 108 is connected between the input voltage source and the board load. The switch connects the voltage source to the board circuits which are indicated by the load capacitor $C_L$ 110. A control circuit 112 connects to the gate and controls the switch 108. Inputs to the control circuit are from connections on either side of the switch. On the input voltage side of the switch, a shunt resistor 114 is used in the connection to the control circuit 112.

The control circuit compares the voltage drop across the switch and the voltage drop on the shunt resistor 114 to control the input current through the switch 108. The current is held to a maximum current to charge the load capacitor on powerup or during an overload condition. In embodiments of the present invention, the RDS(on) will increase with increased current due to device self-heating. This will cause the current to fold back during an overcurrent condition.

Figure 3B:
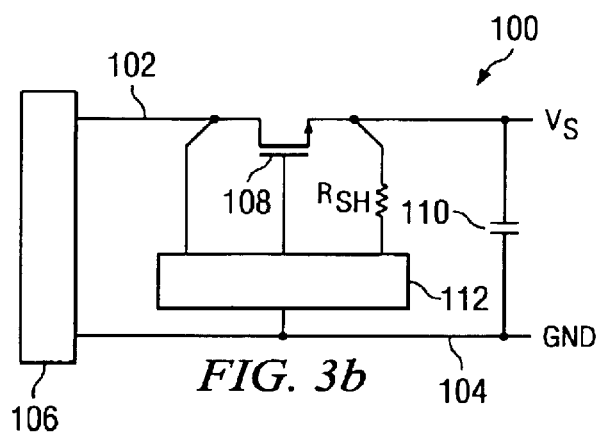
Figure 4:
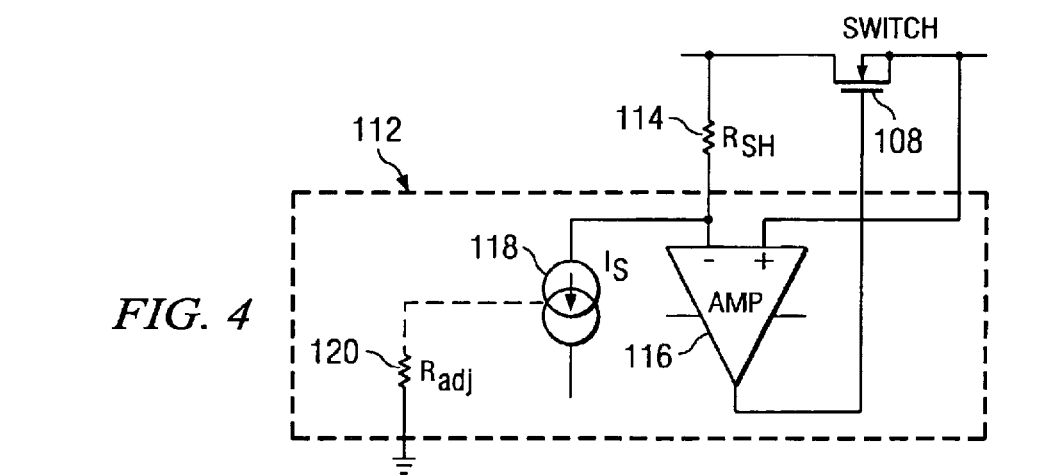
FIG. 4 illustrates a circuit diagram according to an embodiment of the present invention.

FIG. 4 illustrates a circuit diagram according to another embodiment of the present invention. This embodiment is substantially similar to the above embodiment, but includes further detail for the control circuit 112. The circuit has the same voltage source $V_s$ 102, voltage reference (GND) 104, and switch 108 connections as described for the embodiment in FIG. 3. The control circuit 112 connects to the gate and controls the switch 108. Inputs to the control circuit are from connections on either side of the switch. On the input voltage side of the switch, a shunt resistor 114 is used in the connection to the control circuit 112. The shunt resistor is selected to set the threshold for the current limit for the switch 108.

In the preferred embodiment illustrated in FIG. 4, the connections to the control circuit from either side of the switch are connected to an amplifier 116. The connection from the shunt resistor is connected to the minus terminal, and the connection from the load side of the switch is connected to the plus terminal. The amplifier in the control circuit compares the voltage drop across the switch and the voltage drop across the shunt resistor 114 to control the input current through the switch 108 with the output of the amplifier connected to the gate of switch 108. The switch 108 is preferably a field-effect transistor, where an N-type device is illustrated.

Again referring to FIG. 4, a current source 118 is preferably connected as shown from the minus input of the amplifier and the shunt resistor. The current source is used to bias the voltage on the shunt resistor. The current source that sets the voltage drop across the shunt resistor is preferably a linear temperature dependent source, such as a PTAT (Proportional To Absolute Temperature) source, and can be adjusted by a resistor 120 if so desired. The temperature dependency of the current source (presumably linear) which drives the shunt resistor largely compensates for variation of RDS(on) versus temperature, as neither the external power FET nor the control chip dissipate large amounts of heat in normal operation.

Other Embodiments

Figure 5:
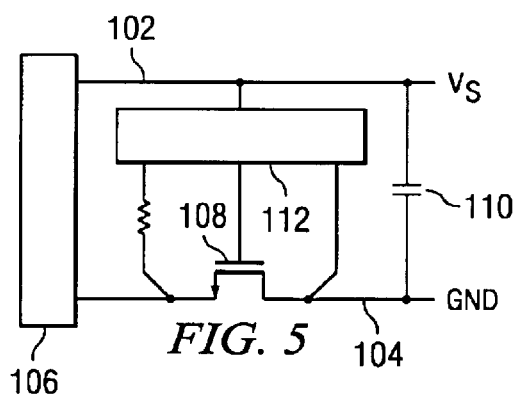
FIG. 5 illustrates a circuit diagram of a control circuit according to an embodiment of the present invention.

Although the present invention has been described in detail, it should be understood that various changes, substitutions, and alterations could be made hereto without departing from the spirit and scope of the invention as defined by the appended claims. For example, FIG. 5 illustrates a circuit diagram according to another embodiment of the present invention. This embodiment is very similar to the above embodiment, except that the switch element 20 has been placed in the low side of the power source 14.

In another embodiment, a P-type device may be substituted for the N-type device providing that the polarities of the inputs of amplifier 116 are reversed.

In another embodiment, the shunt resistor 114 may be placed in the control circuit connection to the output side of the switch rather than the supply side of the switch as shown in FIG. 3b. This embodiment would require the polarity of the current source 118 be reversed to push current into the shunt resistor rather than draw a current out. In this embodiment, similar to the previous embodiments, the voltage across the shunt resistor sets the voltage drop allowed across the switch before the amplifier activates.

In another embodiment, the adjustment resistor 120 can be located outside the IC for the control circuit so that the user may select the bias current of the shunt resistor.

What is claimed is:

1. A current limiting circuit for a switch comprising:
   a. a switch connected to a power supply and a load;
   b. a shunt resistor having a first and second terminal, with the first terminal connected to the switch; and
   c. a control circuit connected to the second terminal of the resistor and to the load side of the switch;
   d. wherein the control circuit monitors the voltage across the switch and the voltage across the shunt resistor and limits the current through the switch to a predetermined maximum current as determined by the voltage across the shunt resistor and the voltage across the switch.

2. The circuit of claim 1 wherein the first terminal of the resistor is connected to the supply side of the switch.

3. The circuit of claim 1 wherein the first terminal of the resistor is connected to the load side of the switch.

4. The circuit of claim 1 wherein the switch is connected to the low side of the supply.

5. The circuit of claim 1 wherein the switch is connected to the high side of the supply.

6. The circuit of claim 5 further comprising a current source that sets a bias voltage drop across the shunt resistor and the current source is a linear temperature dependent source to compensate for variation of switch on resistance (RDS(on)) versus temperature.

7. The circuit of claim 1 wherein the switch is a N-channel FET transistor.

8. The circuit of claim 1 wherein the switch is a P-channel FET transistor.

9. The circuit of claim 1 wherein the circuit is incorporated in an integrated circuit except for the shunt resistor which is an external resistor.

10. The circuit of claim 3 wherein the circuit is incorporated in an integrated circuit except for the shunt resistor and an adjustment resistor connected to the current source, which are external resistors.

11. A current limiting circuit for a MOS transistor switch for a hot swap board application comprising:
    a. a switch connected to a power supply and a load;
    b. a shunt resistor having a first and second terminal, with the first terminal connected to the switch; and
    c. a control circuit connected to the second terminal of the resistor and to the load side of the switch;
    d. wherein the control circuit monitors the voltage across the switch and the voltage across the shunt resistor and limits the current through the switch to a predetermined maximum current set by the shunt resistance.

12. The circuit of claim 11 wherein the first terminal of the resistor is connected to the supply side of the switch.

13. The circuit of claim 11 wherein the first terminal of the resistor is connected to the load side of the switch.

14. The circuit of claim 11 wherein the switch is connected to the low side of the supply.

15. The circuit of claim 11 wherein the switch is connected to the high side of the supply.

16. The circuit of claim 15 further comprising a current source that sets a bias voltage drop across the shunt resistor and the current source is a linear temperature dependent source to compensate for variation of switch on resistance (RDS(on)) versus temperature.

17. The circuit of claim 11 wherein the switch is a N-channel FET transistor.

18. The circuit of claim 11 wherein the switch is a P-channel FET transistor.

19. The circuit of claim 11 wherein the circuit is incorporated in an integrated circuit except for the shunt resistor which is an external resistor.

20. The circuit of claim 11 wherein the circuit is incorporated in an integrated circuit except for the shunt resistor and an adjustment resistor connected to the current source, which are external resistors.

* * * * *